G. W. TOPLIFF, C. BORNMANN & E. C. CLARK.
AUTOMATIC FILM WINDING CAMERA.
APPLICATION FILED AUG. 29, 1917.
1,268,805.
Patented June 4, 1918.
3 SHEETS—SHEET 1.
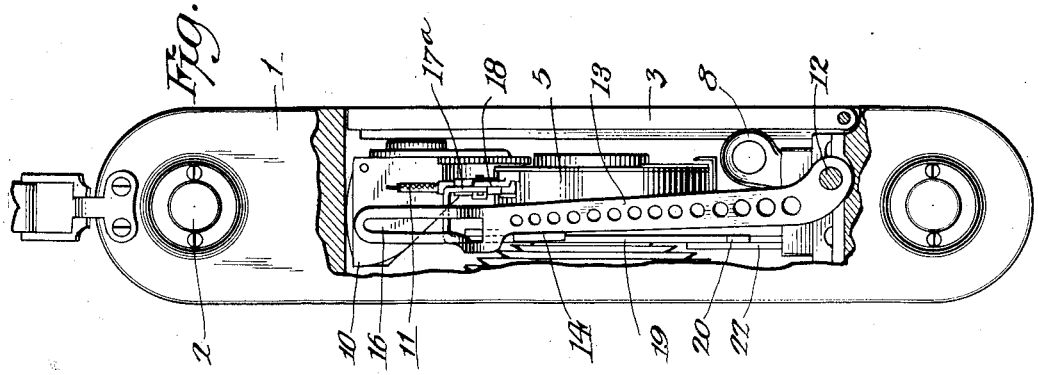
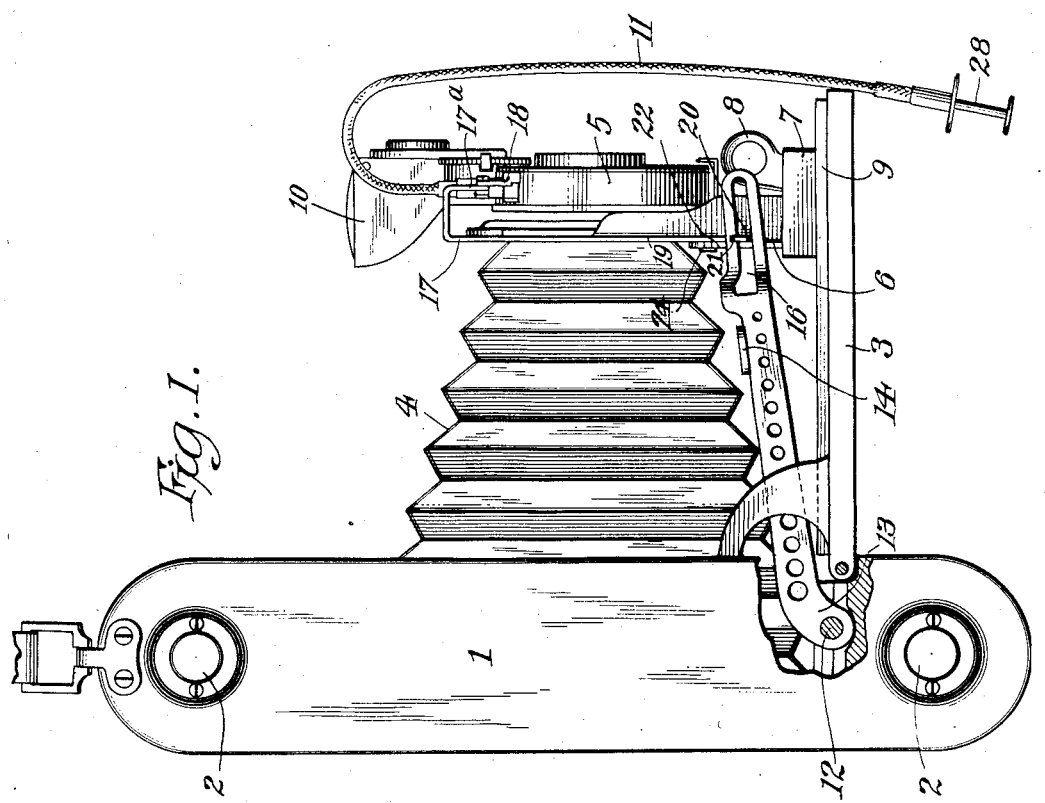

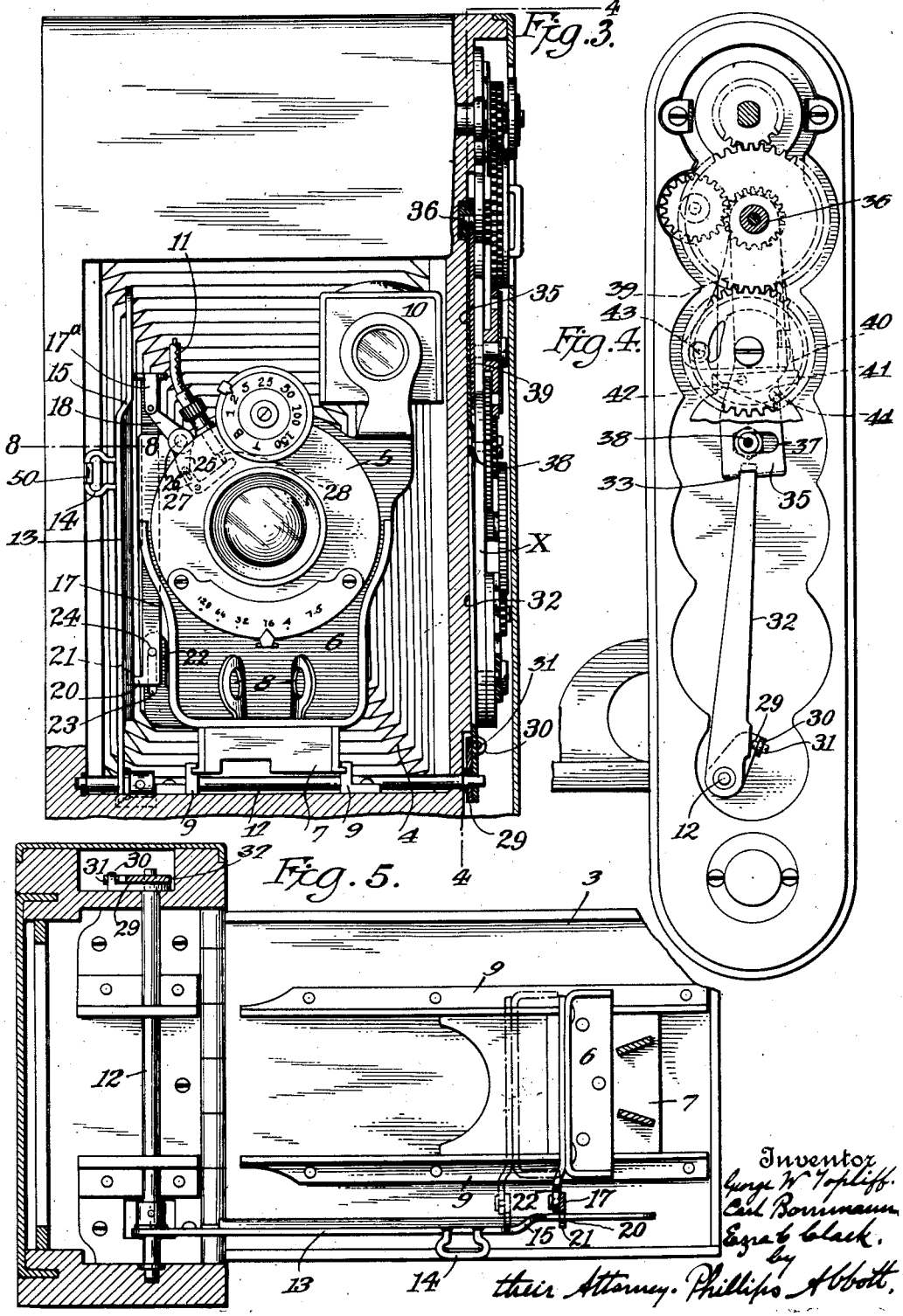

G. W. TOPLIFF, C. BORNMANN & E. C. CLARK.
AUTOMATIC FILM WINDING CAMERA.
APPLICATION FILED AUG. 29, 1917.

1,268,805.

Patented June 4, 1918.
3 SHEETS—SHEET 3.

Inventor
George W. Topliff, Carl Bornmann, Ezra C Clark
By their Attorney
Phillips Abbott

UNITED STATES PATENT OFFICE.

GEORGE W. TOPLIFF, CARL BORNMANN, AND EZRA C. CLARK, OF BINGHAMTON, NEW YORK, ASSIGNORS TO ANSCO COMPANY, OF BINGHAMTON, NEW YORK, A CORPORATION OF NEW YORK.

AUTOMATIC FILM-WINDING CAMERA.

1,268,805.   Specification of Letters Patent.   Patented June 4, 1918.

Application filed August 29, 1917.   Serial No. 188,702.

*To all whom it may concern:*

Be it known that we, GEORGE W. TOPLIFF, CARL BORNMANN, and EZRA C. CLARK, all citizens of the United States, and residents of the city of Binghamton, county of Broome, and State of New York, have invented a new and useful Improvement in Automatic Film-Winding Cameras, of which the following is a specification, reference being had to the accompanying drawings.

Our invention is an improvement upon that patented in and by United States Letters Patent Nos. 1,197,901, dated September 12, 1916 and 1,216,543 dated February 20, 1917, both issued to Ansco Company as the assignee of Carl Bornmann and Ezra C. Clark. This present invention has for its object, among other things, to improve the cameras described and illustrated in said patents, by the addition thereto of devices whereby the shutter may be operated and the advance of the film accomplished by the performance of one and the same act on the part of the operator and in such manner that the speed of the operation is increased and double exposure absolutely prevented; also different means are provided whereby the shutter may be actuated and the film winding mechanism released, and they are so constructed that they may be operated by finger release at two separate points or by wire, cable, or pneumatic release as preferred and in such manner that instantaneous exposures, limited time exposures, or full time exposures may be made, at the conclusion of each of which the film advancing mechanism is invariably released, so that an unexposed section of film is advanced into the focal field in position for the next succeeding exposures and all possibility of double exposure avoided. Furthermore, the parts are so constructed and arranged that film of any regular make may be used in the camera and when it is collapsed or folded, the parts automatically move to and assume positions protected within the camera, and similarly when the dropfront is lowered and the lens frame and bellows are extended, the parts automatically assume their proper relative positions.

Figure 6:
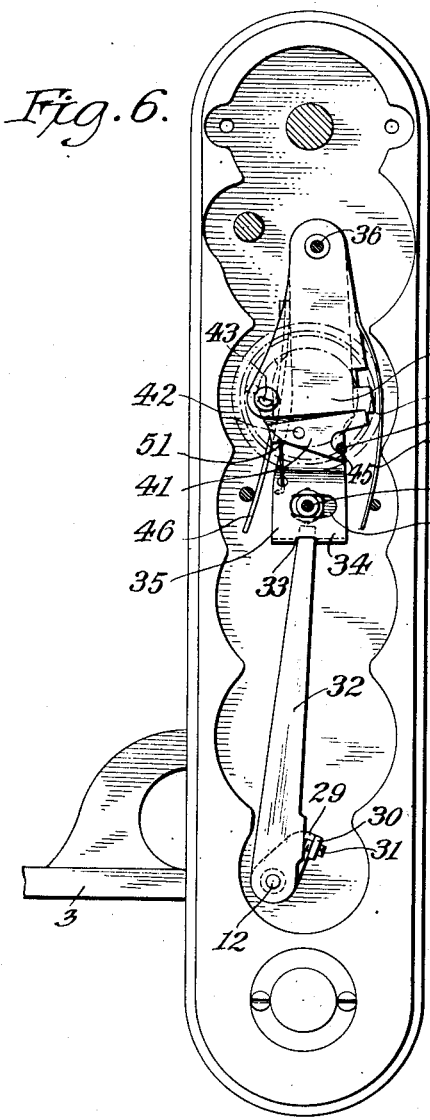
Figure 7:
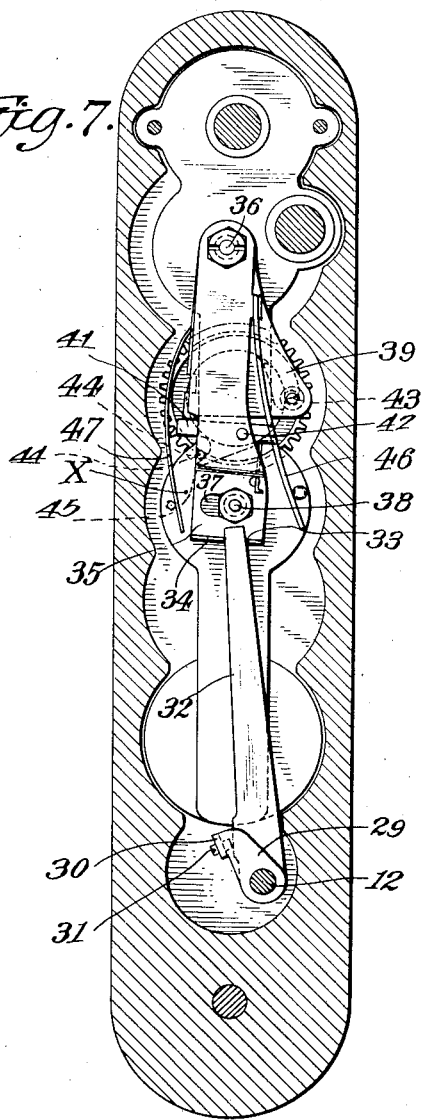
Figure 8:
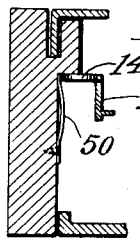

Referring to the drawings, Figure 1 is a side elevation, partly broken away, of a folding camera embodying one form of our invention, the parts being extended ready for use; Fig. 2 is a side elevation of the form of the invention shown in Fig. 1, partly broken away, the parts being in their respective positions when folded, as for transportation; Fig. 3 is a front elevation, partly in section, of the interior of the camera, showing the parts in their folded position; Fig. 4 is an edgewise elevation of that which is shown in Fig. 3 taken on the line 4—4 of that figure and looking to the right; Fig. 5 is a plan view, partly in section, and with the dropfront lowered, the lens, lens frame, bellows and co-acting parts being removed; Fig. 6 is a sidewise elevation, partly in section, illustrating the release mechanism, the train of gearing and indicators being removed; Fig. 7 is an edgewise elevation, partly in section, and taken in a direction the opposite of Fig. 6; Fig. 8 is a sectional view, partly in elevation, on the line 8—8 of Fig. 3, showing a detail of construction.

In the drawings, 1 represents the body of the camera, 2, 2, the centers for the spools, 3 the dropfront, 4 the bellows, 5 the lens casing, 6 the lens frame, 7 the slideways for the frame, 8 the thumb plates for the lens frame clamp, 9 the slideway on the dropfront, 10 the finder, 11 the wire cable release. All these parts, as well as the general construction of the camera, may be such as preferred. 12 is a shaft, which extends across the inside of the camera from side to side thereof projecting through the wall of the camera into the chamber where the automatic film feeding mechanism is located. This shaft is supported upon suitable bearings in any preferred manner. 13 is a lever fast upon the shaft 12, which may be provided with perforations, as shown in Figs. 1 and 2 to reduce its weight. 14 is a finger pressure plate, which may beneficially rest upon the edge of the lever 13, which is bent, or has an offset 15, as shown in Fig. 5, and beyond the offset it is slotted as shown best at 16 in Fig. 1. 17 is a link preferably rectangular in shape at its upper end, as shown best in Fig. 1, the short arm 17$^a$ whereof is pivoted to the shutter release arm 18 (see Figs. 1 and 2) and the longer arm 19 (see Fig. 1) projects downwardly and has a right angle projection 20, see Fig. 3, at its lower end, with an upwardly turned finger or terminal 21 (see Fig. 1). This downwardly extending end of the longer arm or member of this link is supported by a bracket 22, which is slotted as at 23, see Fig. 3, there being a guide pin 24 on the arm which works through the slot 23, and by which it is guided in its up and down movements. The short member 17ª of the rectangular link is, as stated above, pivoted to a part of the shutter release mechanism, to wit, the arm 18. The shutter release apparatus may be made in any preferred form. We show it as comprising the arm 18 with an integral part 25, both being pivoted at 26 to some fixed part of the apparatus and engaging with a slotted bell-crank 27 with the other end of which the terminal 28 of the wire release 11, or pneumatic release, as the case may be, engages. These parts, in a manner well understood, when properly actuated, release the shutter mechanism, the detail of which constitutes no part of this present invention and therefore will not be illustrated or described.

As stated above, one end of the shaft 12 projects through the wall of the camera and enters the chamber containing the film feeding mechanism and on the end of this shaft there is rigidly secured a short crank 29, which has a rectangular portion 30 at its end in which is a set screw 31, the end of which engages with a release lever 32, which is or may be loosely mounted upon the shaft 12. The set screw 31 has certain important functions; by adjusting it in or out, as the case may be, the shutter operating lever 13 may be correctly located so that it and its co-acting parts will have the proper stroke to release shutters of different makes and also by means of the set screw 31 the relation of the lever 13 to its adjacent parts and the throw of the release lever 32 of the film winding mechanism may be adjusted should occasion require. The free end of the lever 32 passes through an opening 33 made in a lip or flange 34 at the lower end of an oscillating plate 35, which at its upper end is pivoted as at 36 and is provided preferably near its lower end with a slot 37 and guide pin 38, as shown best in Figs. 6 and 7. 39 is another oscillating plate pivoted upon the same center 36 as that upon which the plate 35 is pivoted. At its lower edge it is provided with a lip 40, which normally engages with a pawl 41 pivoted at 42 on the oscillating plate 35. The plate 39 likewise carries the release pin 43 which is in function, construction and method of operation substantially the same as the release pin 36 of the above stated United States Patent 1,197,901. As fully set forth in said former patents the film advancing train of gearing is supported upon base plate, which in this present case we represent by X (see Fig. 7) and rigidly fastened to this base plate is a pin 44, which engages in a hook-like projection 45 (see Fig. 6) from the pawl 41. 46 and 47 are springs which engage respectively with the oscillating plates 35 and 39, tending to return them always to their normal position.

The operation is as follows: Assuming that the camera has been used and it is desired to fold it again for transportation. The finger plates 8 of the lens frame clamp being suitably manipulated, the lens frame, lens and bellows carrying the finder with them are pushed back into the box of the camera as usual. During this movement the rectangular lower end 20—21 of the longer member of the shutter release link 17 in its rearward movement together with the lens frame and associated parts, slides through the slot 16 made in the offset terminal section of the lever 13 as shown best in Fig. 1, and when the rectangular terminal lens reaches the offset portion of the lever 13, it passes out therefrom through the said off-set portion, as shown in dotted lines in Fig. 5, and thereafter moves rearwardly with the bellows, lens frame, etc., being supported and maintained in position by the bracket 22, and after these moving parts have been pushed fully within the box of the camera, then the lever 13, which is left in an outwardly and substantially horizontal position, is simply tipped over backwardly into the box of the camera, because movement in this direction can be freely had since the crank 29 does not engage with the lever 32 when the lever 13 is tipped upwardly and rearwardly, only when it is moved downwardly and forwardly. The lever 13 is held in its retracted position by a little spring 50 as shown in Fig. 8. The wire release 11 being now tucked away within the camera box, the dropfront 3 may be folded up and the camera closed in the usual manner.

Now to make an exposure, the drop front is lowered, the lever 13 is tipped forwardly again into the position shown in Fig. 1, the lens frame clamp plates 8 are properly manipulated and the lens frame, lens and bellows carrying with them the rectangular link 17, are drawn forwardly, and during this movement the rectangular lower or terminal end of the long member of the link 17, by a reversal of the movements above described, passes through the offset portion of the lever 13, and enters the slot 16 in its outer end. Now to make an exposure, the subject is found in the finder in the usual way and then the operator operates the shutter either by pressing with his thumb or finger upon the finger plate 14 of the lever 13, in which event, through the link 17, pressure will be brought to bear upon the shutter release devices 18, 25, 27, etc., or he may press upon the upper rectangular portion of the link 17, or by manipulation of the wire or pneumatic release similarly effect the release of the shutter devices with the result in either case that the release lever 32 of the film winding mechanism will be moved in such manner as to effect the following operation of the parts, reference being had particularly to Figs. 6 and 7; that is to say, whichever course he pursues, the result will be that through the instrumentality of the parts just described, there will result depression of the lever 13, and consequent rocking of the shaft 12, and through the engagement of the little crank 29, with its set screw 31 and the lever 32, the oscillating plates 35 and 39, carrying with them the pawl 41 will all be moved to the left, as shown in Fig. 6, or to the right, as shown in the reversed Fig. 7, and that as soon as pressure upon the shutter releasing devices is removed, the lever 13 and all the associated and co-acting parts above described will immediately return to primary position, whereupon the spring 46, which has been put under stress by the movement of the oscillating plates to the left, immediately returns them and the pawl 41 carried by them to the right, in other words, to normal position, whereupon the inclined lip 45 upon the pawl 41 will be brought in contact with the fixed pin 44, with the result that the pawl will be drawn downwardly, compressing its spring 51 and releasing the oscillating plate 39 from its control by the pawl engaging with the lip 40, whereupon the spring 47 will immediately oscillate the plate 39 to the right, releasing the stop pin 43 and consequently the film advancing mechanism.

It will be noted from the above description that in making every exposure, whether instantaneous, semi-time or full time, that the shutter, once actuated, it will be impossible to release it without the machine automatically advancing the film, in other words, in each and every case it will be inevitable that upon the release of the shutter mechanism, the automatic film advancing devices will, without any act, care or attention on the part of the operator, remove from the focal field the just exposed section of the film and advance into it an unexposed section, thus double exposure will be impossible.

It will be obvious to those who are familiar with such matters that modifications may be made in the details of construction of the parts involved in our invention and still the essentials thereof be retained. We therefore do not limit ourselves to the specific construction and arrangement as described and illustrated, since they constitute one form only in which our invention may be embodied.

We claim:

1. In a film-roll camera having means for the automatic advance of the film, shutter actuating devices adapted to be operated through three separate and distinct devices permanently connected with the camera, said devices being so constructed, combined and correlated that the operation and release of the shutter mechanism by either of them will be immediately and inevitably followed by the release of the film advancing mechanism.

2. In a film-roll camera having means for the automatic advance of the film, a shaft extending transversely of and supported within the box of the camera, one end whereof passes through one wall of the camera and enters the chamber containing the film advancing mechanism, a crank fast on the shaft within the said chamber, means connecting the shutter mechanism with said shaft, whereby the latter is inevitably moved at each actuating of the shutter releasing devices, and devices connecting the crank on the shaft and the film advancing mechanism, whereby upon the release of the shutter the film advancing mechanism will immediately and inevitably operate.

3. In a film-roll camera having means for the automatic advance of the film, a shaft located within the box of the camera, a forwardly extending lever fast on the shaft, a connection between the free end of the lever and the shutter releasing devices, and devices connecting the shaft and the film advancing mechanism, whereby upon the depression either of said lever or the connecting device between it and the shutter mechanism, the latter will be actuated and upon the release thereof the film advancing mechanism will be actuated.

4. In a film-roll camera having means for the automatic advance of the film, a shaft located within and transversely of the box of the camera, a forwardly extending lever fast on the shaft, a link connecting the free end of the lever with the shutter, releasing devices, a crank on the shaft, means connecting the shaft and the film advancing mechanism, whereby upon the depression either of said lever or said link, the shutter mechanism will be actuated and upon the release thereof the film advancing mechanism will be actuated, and means whereby the shutter actuating mechanism and said link and lever may all be simultaneously released and returned to their primary position.

5. In a folding film-roll camera having means for the automatic advance of the film, a shaft located within the box of the camera, a lever fast on the shaft, a link connecting the free end of the lever with the shutter releasing devices, and means engaging the shaft and the film advancing mechanism, whereby upon the depression of either said lever or said link, the shutter mechanism will be actuated and upon the release thereof the film advancing mechanism will be actuated, the co-acting ends of the said lever and said link being so constructed that they automatically engage with each other upon the unfolding of the camera and automatically disengage upon the folding thereof.

6. In a film-roll camera having means for the automatic advance of the film, a shaft located within the box of the camera, a lever fast on the shaft, means connecting said lever with the shutter releasing devices, a crank on the shaft, a lever for releasing the film advancing mechanism, and a set screw on the crank, whereby the location of the first named lever and its relation to the co-acting parts may be adjusted.

7. In a film-roll camera having means for the automatic advance of the film, a shaft located within the box of the camera, a lever fast on the shaft, means connecting said lever with the shutter releasing devices, a crank on the shaft, a lever for releasing the film advancing mechanism, and an adjustable device between the crank and the last named lever, whereby the throw of the latter by the crank may be adjusted.

8. In a film-roll camera having means for the automatic advance of the film, a shaft located within the box of the camera, a lever fast on the shaft, means connecting said lever with the shutter releasing devices, a crank on the shaft, a lever for releasing the film advancing mechanism, and an adjustable device between the crank and the last-named lever, whereby the throw of the latter by the crank and the location of the first-named lever and its relation to the co-acting parts may both be adjusted.

In testimony whereof we have signed our names to this specification.

GEO. W. TOPLIFF.
CARL BORNMANN.
EZRA C. CLARK.